US012676889B2

(12) United States Patent
Singla

(10) Patent No.: US 12,676,889 B2
(45) Date of Patent: Jul. 7, 2026

(54) AUTOMATED SECURITY RULE UPDATES BASED ON ALERT FEEDBACK

(71) Applicant: Google LLC, Mountain View, CA (US)

(72) Inventor: Anurag Singla, Cupertino, CA (US)

(73) Assignee: Google LLC, Mountain View, CA (US)

( * ) Notice: Subject to any disclaimer, the term of this patent is extended or adjusted under 35 U.S.C. 154(b) by 158 days.

(21) Appl. No.: 17/943,655

(22) Filed: Sep. 13, 2022

(65) Prior Publication Data

US 2024/0089293 A1     Mar. 14, 2024

(51) Int. Cl.
*H04L 9/40* (2022.01)

(52) U.S. Cl.
CPC .......... *H04L 63/20* (2013.01); *H04L 63/1416* (2013.01)

(58) Field of Classification Search
CPC . H04L 63/20; H04L 63/1416; H04L 63/1408; H04L 63/0263; H04W 4/02; H04W 12/37; H04W 12/63
See application file for complete search history.

(56) References Cited

U.S. PATENT DOCUMENTS

| 10,832,248 | B1 * | 11/2020 | Kramme | ................. | G06N 20/00 |
| 11,218,447 | B2 * | 1/2022 | Cloud | ..................... | H04L 63/20 |
| 11,290,483 | B1 * | 3/2022 | Kannan | ............... | H04L 63/1433 |
| 2006/0230442 | A1 * | 10/2006 | Yang | .................. | H04L 63/0263 |
| | | | | | 726/11 |

| 2009/0113550 | A1 * | 4/2009 | Costa | ...................... | G06F 21/55 |
| | | | | | 726/25 |
| 2015/0356445 | A1 * | 12/2015 | Lingafelt | ............... | G06N 5/025 |
| | | | | | 706/47 |
| 2016/0330219 | A1 | 11/2016 | Hasan | | |
| 2017/0302702 | A1 * | 10/2017 | Hu | ........................ | G06F 21/554 |
| 2019/0132224 | A1 * | 5/2019 | Verma | ..................... | G06F 18/24 |
| 2020/0128047 | A1 | 4/2020 | Biswas et al. | | |
| 2020/0329011 | A1 * | 10/2020 | Cai | ...................... | H04L 41/145 |
| 2021/0084013 | A1 * | 3/2021 | Mutnuru | ............. | H04L 41/0894 |
| 2021/0248145 | A1 | 8/2021 | Parker | | |
| 2022/0046031 | A1 * | 2/2022 | Kaidi | .................. | H04L 63/1433 |
| 2022/0391500 | A1 * | 12/2022 | Chen Kaidi | .......... | G06F 21/552 |
| 2023/0131525 | A1 * | 4/2023 | Šopík | .................... | G06F 21/561 |
| | | | | | 726/1 |

OTHER PUBLICATIONS

Liu et al., "A Review of Rule Learning-Based Intrusion Detection Systems and Their Prospects in Smart Grids", 2021, IEEE, vol. 9, 57542-57564 (Year: 2021).*

(Continued)

*Primary Examiner* — Kambiz Zand
(74) *Attorney, Agent, or Firm* — Lerner David LLP

(57) ABSTRACT

Aspects of the disclosure are directed to systems, method, and computer-readable mediums for reducing the number of false positive alerts generated by a SIEM system by adjusting the set of rules the SIEM system uses to analyze attributes of the network traffic and/or system activities based on feedback from a SOAR system. Alert feedback may be received for a set of alerts generated in response to attributes triggering one or more rules. The alert feedback may indicate, for each alert of the set of alerts, whether the alert was a true positive alert or false positive alert. One or more conditions of the at least one rule may be adjusted based on the feedback.

19 Claims, 9 Drawing Sheets

(56)  References Cited

OTHER PUBLICATIONS

International Search Report and Written Opinion for International Application No. PCT/US2023/031394 dated Dec. 4, 2023. 14 pages.
Office Action for European Patent Application No. 23773046.0 dated Jan. 29, 2026. 7 pages.
Empl et al. SOAR4IoT: Securing IoT Assets with Digital Twins. Aug. 23, 2022. Proceedings of the 59th ACM/IEEE Design Automation Conference, ACMPUB27, New York, NY, USA, pp. 1-10, DOI: 10.1145/3538969.3538975.

* cited by examiner

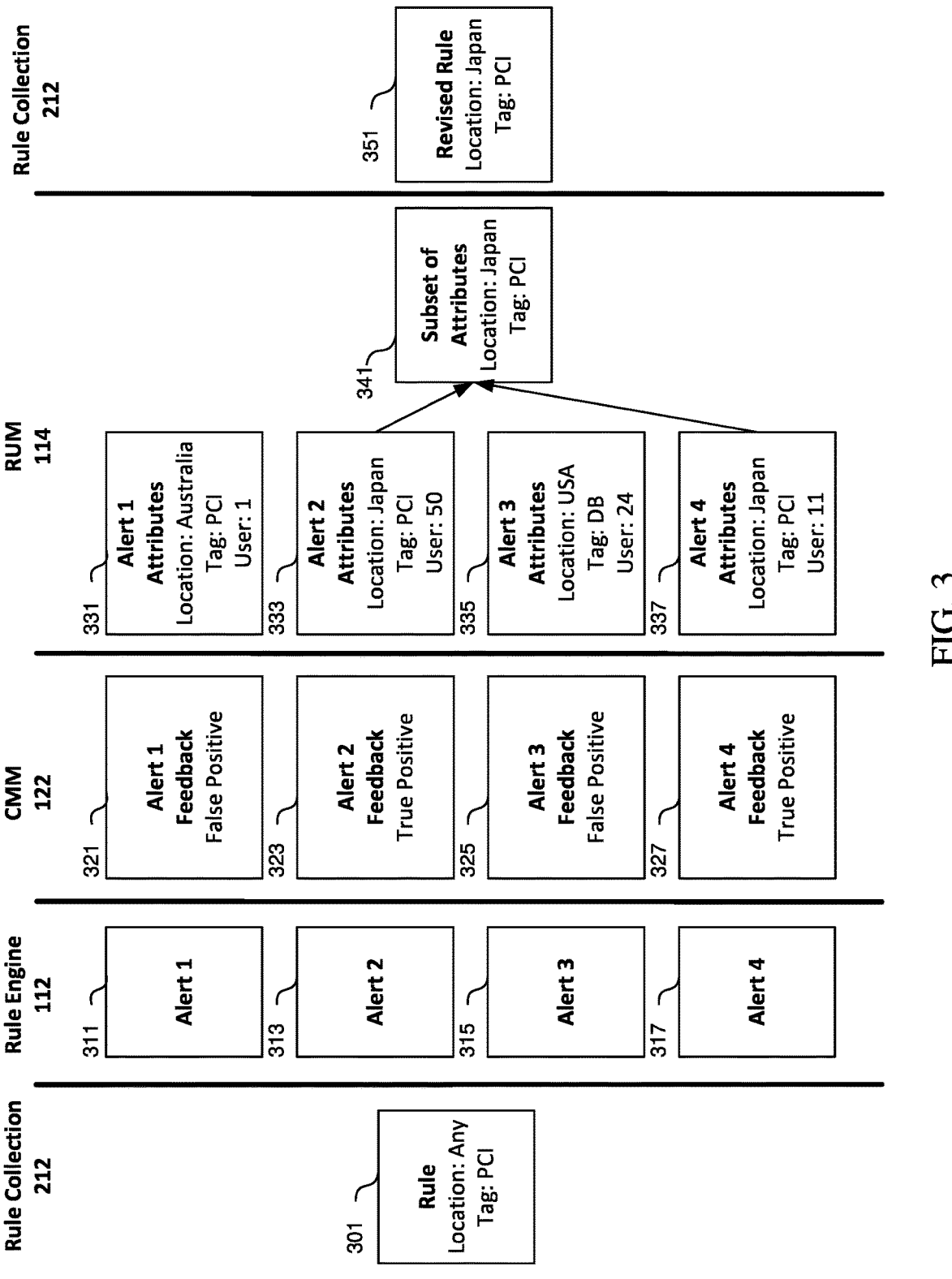

Rule Collection 212

351 — Revised Rule
Location: Japan
Tag: PCI

RUM 114

341 — Subset of Attributes
Location: Japan
Tag: PCI

331 — Alert 1 Attributes
Location: Australia
Tag: PCI
User: 1

333 — Alert 2 Attributes
Location: Japan
Tag: PCI
User: 50

335 — Alert 3 Attributes
Location: USA
Tag: DB
User: 24

337 — Alert 4 Attributes
Location: Japan
Tag: PCI
User: 11

CMM 122

321 — Alert 1 Feedback
False Positive

323 — Alert 2 Feedback
True Positive

325 — Alert 3 Feedback
False Positive

327 — Alert 4 Feedback
True Positive

Rule Engine 112

311 — Alert 1

313 — Alert 2

315 — Alert 3

317 — Alert 4

Rule Collection 212

301 — Rule
Location: Any
Tag: PCI

FIG. 3

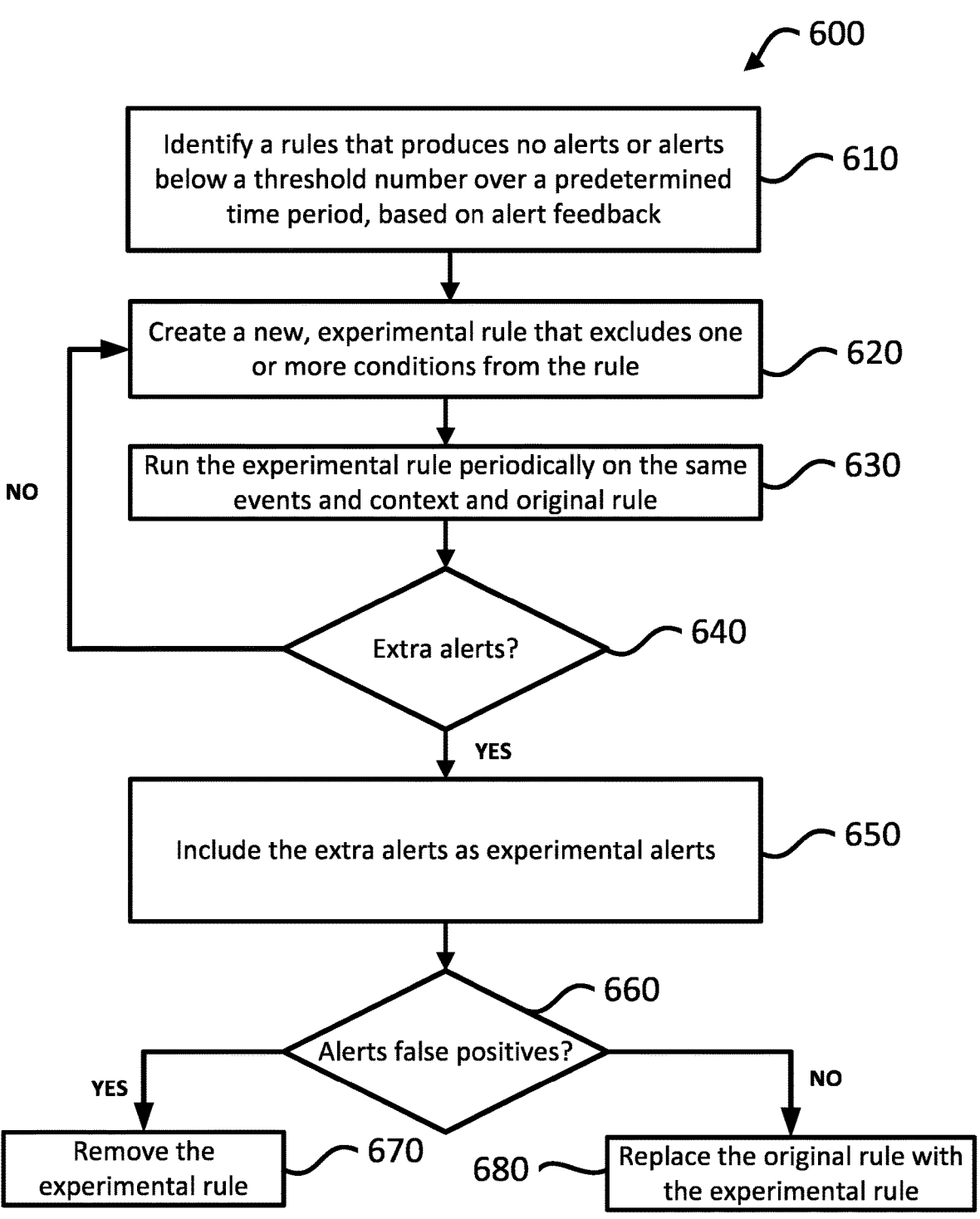

600

Identify a rules that produces no alerts or alerts below a threshold number over a predetermined time period, based on alert feedback ⌇ 610

Create a new, experimental rule that excludes one or more conditions from the rule ⌇ 620

Run the experimental rule periodically on the same events and context and original rule ⌇ 630

Extra alerts? ⌇ 640

NO

YES

Include the extra alerts as experimental alerts ⌇ 650

Alerts false positives? ⌇ 660

YES

NO

Remove the experimental rule ⌇ 670

680 ⌇ Replace the original rule with the experimental rule

FIG. 6

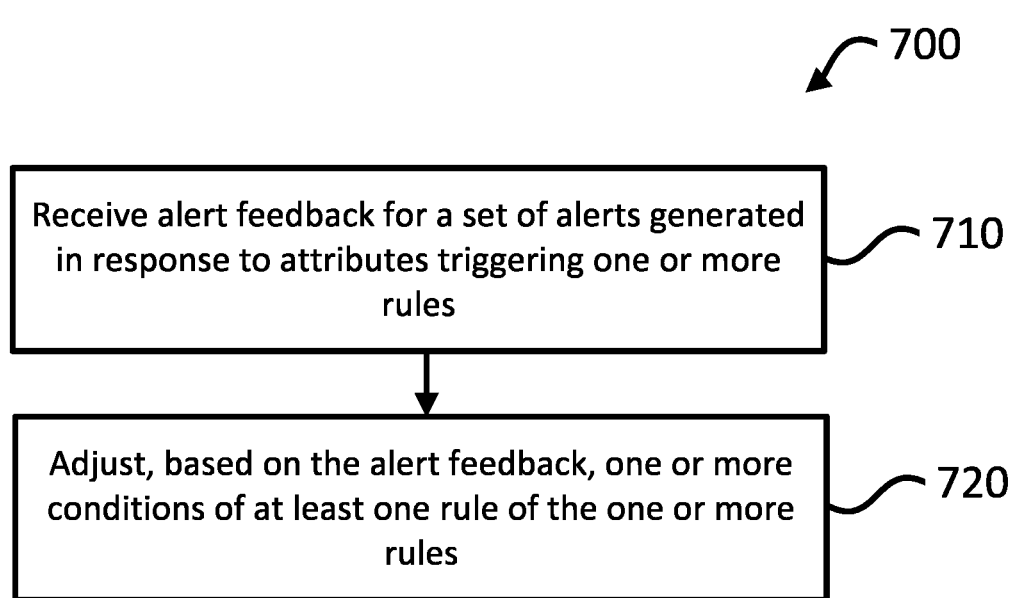
Receive alert feedback for a set of alerts generated in response to attributes triggering one or more rules — 710
Adjust, based on the alert feedback, one or more conditions of at least one rule of the one or more rules — 720
FIG. 7

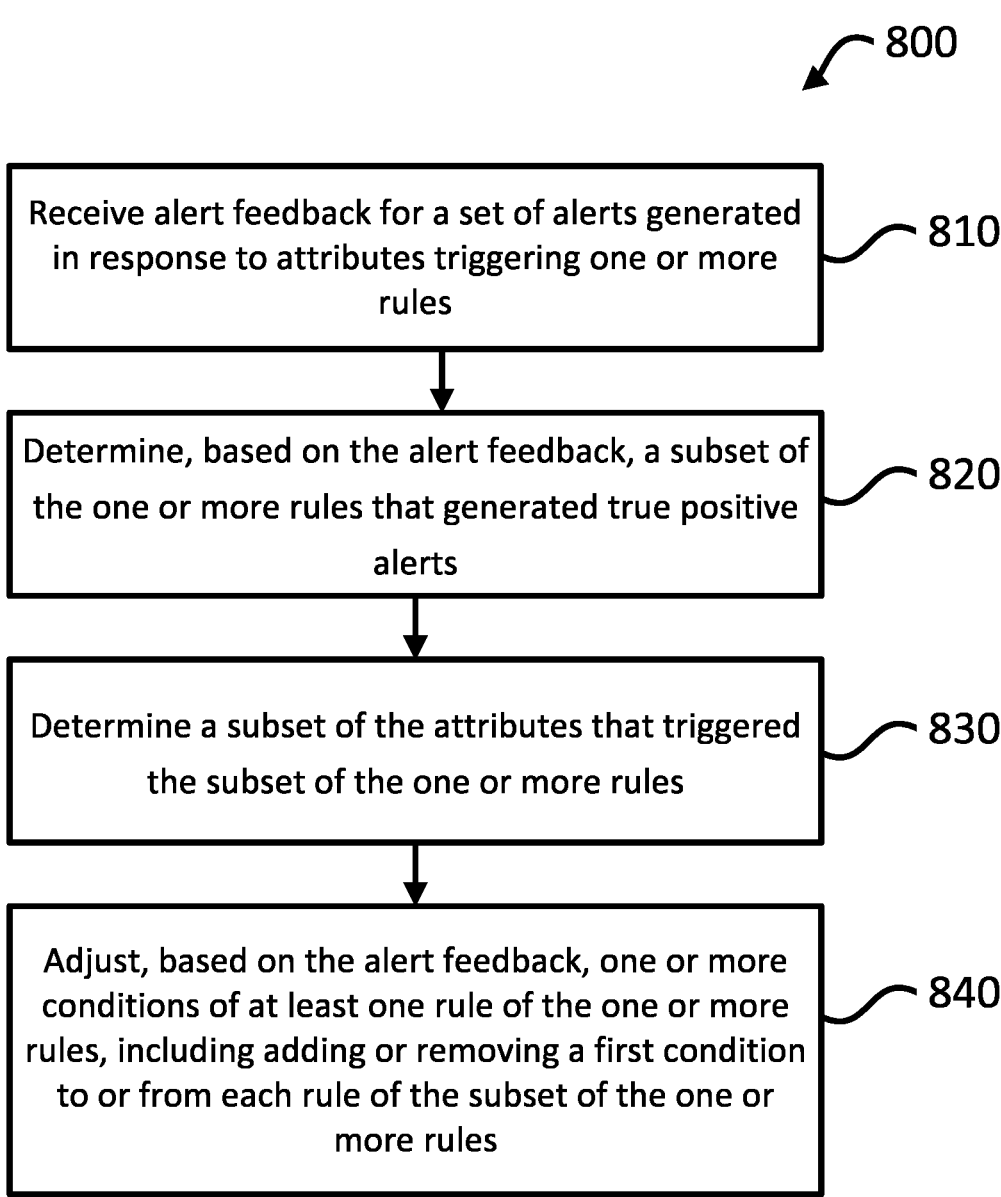

800

Receive alert feedback for a set of alerts generated in response to attributes triggering one or more rules          810

Determine, based on the alert feedback, a subset of the one or more rules that generated true positive alerts          820

Determine a subset of the attributes that triggered the subset of the one or more rules          830

Adjust, based on the alert feedback, one or more conditions of at least one rule of the one or more rules, including adding or removing a first condition to or from each rule of the subset of the one or more rules          840

FIG. 8

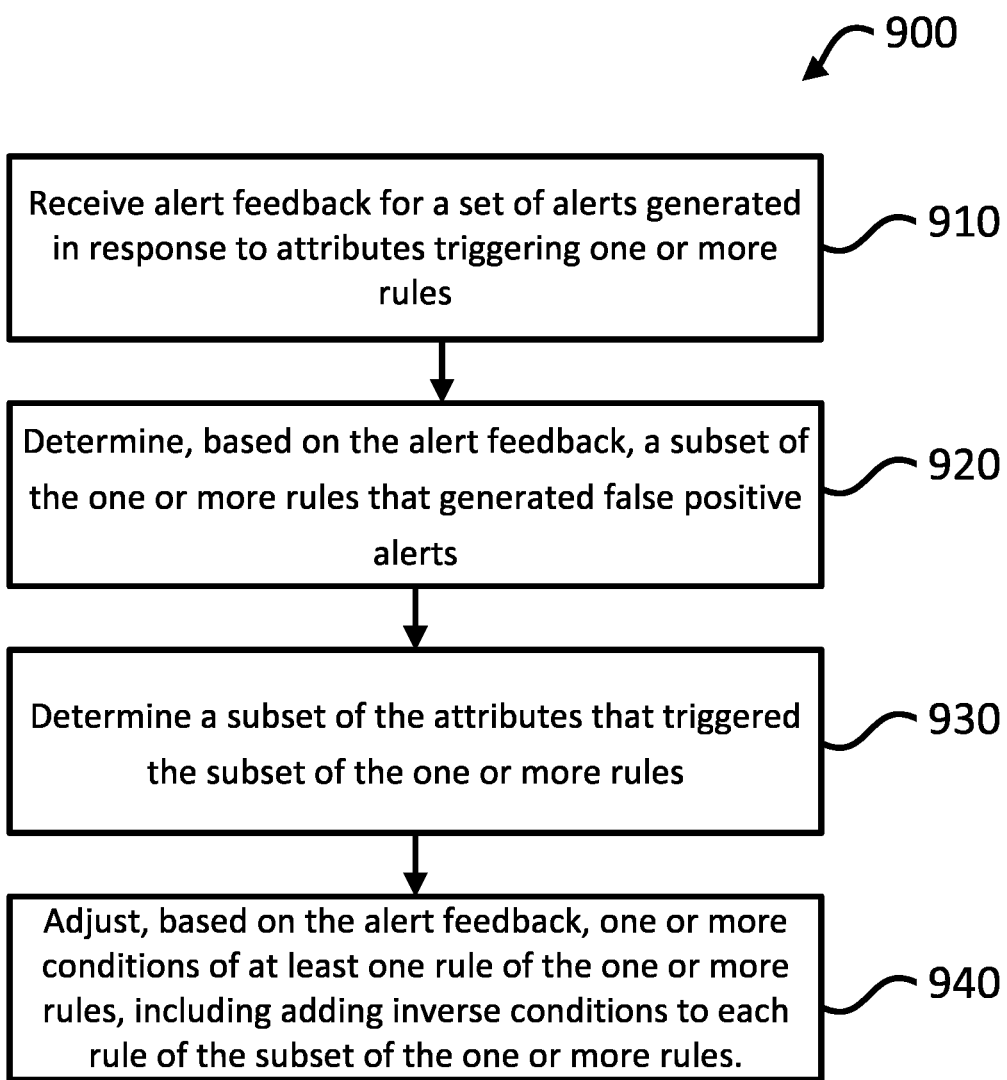

900

Receive alert feedback for a set of alerts generated in response to attributes triggering one or more rules ⟶ 910

Determine, based on the alert feedback, a subset of the one or more rules that generated false positive alerts ⟶ 920

Determine a subset of the attributes that triggered the subset of the one or more rules ⟶ 930

Adjust, based on the alert feedback, one or more conditions of at least one rule of the one or more rules, including adding inverse conditions to each rule of the subset of the one or more rules. ⟶ 940

FIG. 9

AUTOMATED SECURITY RULE UPDATES BASED ON ALERT FEEDBACK

FIELD OF THE DISCLOSURE

The technology described herein relates to detecting and addressing potential security threats on networked systems based on feedback received for previously detected threats.

BACKGROUND

As the number of networked systems and the amount of network traffic increases, network administrators rely on security information event management (SIEM) systems and security orchestration, automation, and response (SOAR) systems to address network security concerns. SIEM systems compare attributes of the network traffic and system activities against a set of rules. The SIEM system may produce an alert when the attributes satisfy or fail to satisfy one of the rules. The alerts may be sent from the SIEM system to the SOAR system, where an analyst may determine whether the alert warrants further investigation. The analyst may use the SOAR system to review the alerts generated by the SIEM system to determine whether the alert is a true positive alert, warranting further investigation, or a false positive alert that can be safely ignored.

The set of rules that the SIEM system compares the network traffic and system activity attributes against is typically over-inclusive to reduce the risk of an alert not being generated for a legitimate security threat. As a result, the SIEM system typically provides the SOAR system with a large volume of alerts, most of which are false positives. However, to ensure that a security threat is not overlooked, the analyst has to sift through each alert to identify the true positive alerts. The volume of false positive alerts affects the analyst's ability to identify and act on true positive alerts promptly.

BRIEF SUMMARY

The disclosure is directed to adjusting the set of rules the SIEM system uses to analyze network traffic attributes of the network traffic and/or system activities to reduce the number of false positive alerts generated by the SIEM system. An aspect of the disclosure is directed to a computer-implemented method. The method may include receiving, by one or more processors, alert feedback for a set of alerts generated in response to attributes triggering one or more rules, the alert feedback indicating, for each alert of the set of alerts, whether the alert was a true positive alert or false positive alert. The one or more conditions of at least one rule of the one or more rules may be adjusted based on the alert feedback. The one or more conditions may correspond to one or more attributes assessed by the at least one rule.

The method may further include determining, based on the alert feedback, a subset of the one or more rules that generated true positive alerts, and determining a subset of the attributes that triggered the subset of the one or more rules. In some instances, adjusting the one or more conditions of the at least one rule includes adding or removing a first condition to each rule of the subset of the one or more rules so that each rule is triggered only when the subset of attributes are present in network traffic or system activities.

The method may further include determining the subset of the one or more rules did not generate false positive alerts.

In some instances, the method may include determining, based on the alert feedback, a subset of the one or more rules that generated false positive alerts, and determining a subset of the attributes that triggered the subset of the one or more rules. Adjusting the one or more conditions of the at least one rule may include adding inverse conditions to each rule of the subset of the one or more rules to prevent the subset of the one or more rules from triggering when the subset of attributes are present in network traffic or system activities. In some instances, the method may include determining the subset of the one or more rules did not generate true positive alerts.

In some examples, the set of alerts are generated by a security information event management (SIEM) system.

In some examples, a security orchestration, automation, and response (SOAR) system provides the alert feedback.

Another aspect of the disclosure is directed to a system comprising a security information event management (SIEM) system. The SIEM system may be configured to receive alert feedback for a set of alerts generated in response to attributes triggering one or more rules, the alert feedback indicating, for each alert of the set of alerts, whether the alert was a true positive alert or false positive alert, and adjust, based on the alert feedback, one or more conditions of at least one rule of the one or more rules.

In some examples, The SIEM system may be further configured to determine, based on the alert feedback, a subset of the one or more rules that generated true positive alerts, and determine a subset of the attributes that triggered the subset of the one or more rules. Adjusting the one or more conditions of the at least one rule may include adding or removing a first condition to each rule of the subset of the one or more rules so that each rule is triggered only when the subset of attributes are present in network traffic or system activities.

In some instances, the SIEM system may be further configured to determine the subset of the one or more rules did not generate false positive alerts. In some examples, the SIEM system may be further configured to determine, based on the alert feedback, a subset of the one or more rules that generated false positive alerts, and determine a subset of the attributes that triggered the subset of the one or more rules. Adjusting the one or more conditions of the at least one rule may include adding inverse conditions to each rule of the subset of the one or more rules to prevent the subset of the one or more rules from triggering when the subset of attributes are present in network traffic or system activities.

In some examples, the SIEM system may be further configured to determine the subset of the one or more rules did not generate true positive alerts.

In some examples, the system may further comprise a security orchestration, automation, and response (SOAR) system. In some examples, the SOAR system may be configured to provide the alert feedback.

In some instances, the one or more conditions correspond to one or more attributes assessed by the at least one rule.

BRIEF DESCRIPTION OF THE DRAWINGS

FIG. 3 is a block diagram illustrating the revision of a rule based on alert feedback, according to aspects of the disclosure.

FIG. 6 is a flow chart of an example process for replacing a rule, according to aspects of the disclosure.

FIG. 7 is a flow chart of an example process for adjusting the conditions of a rule based on alert feedback, according to aspects of the disclosure.

FIG. 8 is a flow chart of another example process for adjusting the conditions of a rule based on alert feedback, according to aspects of the disclosure.

FIG. 9 is a flow chart of another example process for adjusting the conditions of a rule based on alert feedback, according to aspects of the disclosure.

DETAILED DESCRIPTION

Figure 1:
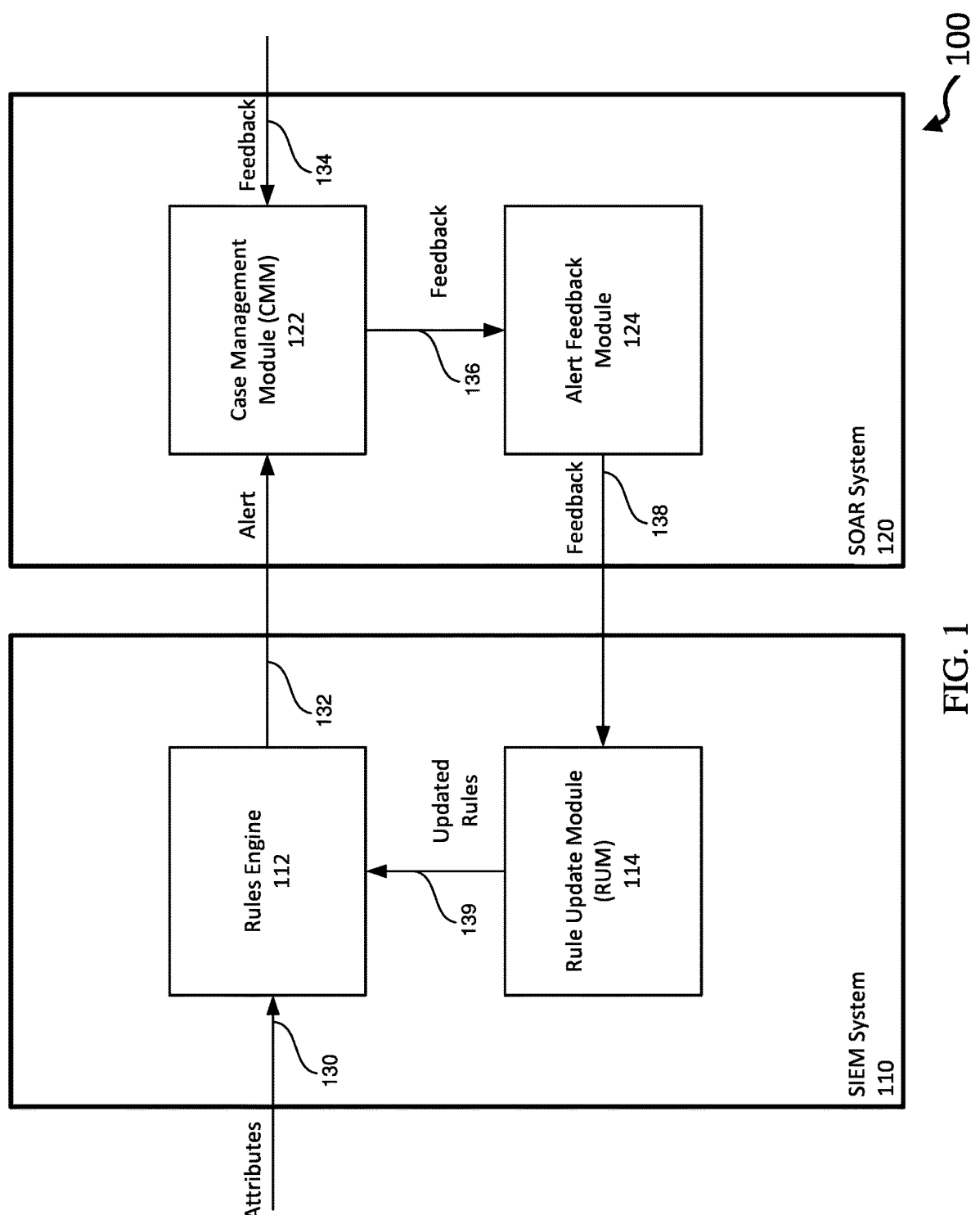
FIG. 1 is a block diagram of an interconnected security management system, according to aspects of the disclosure.

The technology described herein reduces the number of false positive alerts generated by a SIEM system by adjusting the set of rules the SIEM system uses to analyze attributes of the network traffic and/or system activities. Each rule may have a set of one or more conditions associated with attributes. If the conditions of a rule are satisfied (or not satisfied) by monitored attributes, the SIEM system may generate an alert. Each alert may be transmitted to the SOAR system. The SOAR system may be configured to provide feedback to the SIEM system, the feedback indicating whether a generated alert is a true positive or false positive alert. An analyst may enter the feedback into the SOAR system as they review the alerts.

The SIEM system may review the feedback to identify rules that generate true positive alerts and/or false positive alerts. For these identified rules, the SIEM system may determine the attributes assessed by the conditions of the rules. The SIEM system may adjust the conditions of the identified rules or generate new rules based on the conditions of the identified rules to increase the number of true positive alerts and reduce the number of false positive alerts generated by the set of rules, as described herein.

As used herein, attributes may include data contained within or otherwise associated with network traffic data or system activities. For example, attributes may include device data, user data, location data, tags, etc., with each attribute having one or more values.

Device data may include information about the nodes sending, receiving, or otherwise directing the network traffic or executing an activity. For instance, device data may include the type of node (e.g., database machine, client computer, server computer, mobile device, etc.) and information about the node, such as the software executing on the node (e.g., application, operating system, versions, etc.) and the hardware of the node.

User data may include information about the user of the device that generated or received the network data or performed a system activity, such as the user's name, position (e.g., senior administrator, administrator, assistant, etc.), employment (e.g., full-time, part-time, contractor), etc.

Location data may include information corresponding to the geographic location of the node that generated network traffic or performed a system activity. Within the context of network data transmissions, location data may include the location of the source node and the location of the destination node of network traffic. In some instances, location data may include the geographic locations or system locations of intervening nodes through which the network data, including information indicative or associated with system activities, traverses from the source to the destination node. For example, the location data may include the geographic location of the source node and the location of the source node within a network (e.g., the name of the network to which the source node is connected.) Within the context of system activities, location data may include the geographic location of the device or devices that performed the activity or activities.

Tag data may include any other information provided with the network data, such as IP addresses of the receiving, sending, or intervening nodes, business, compliance or functional classification of a node (e.g., Finance, DB, PCI, HIPAA, etc.) or other data within a unified data model.

By updating, creating, and deleting rules based on alert feedback, as described herein, the SIEM system may generate fewer false positive alerts. As the number of false positive alerts is reduced, analysts can focus their attention on addressing true positive alerts instead of spending time determining whether an alert is a false positive and true positive. Accordingly, analysts may be able to more promptly address security concerns.

Example System

FIG. 1 illustrates an example interconnected security management system 100, according to aspects of the disclosure. The system includes a security information event management (SIEM) system 110 and a security orchestration, automation, and response (SOAR) system 120. The SIEM system 110 may include a rules engine 112 and a rules update module (RUM) 114. The SOAR system 120 may include a case management module (CMM) 122 and an alert feedback module 124.

The rule engine 112 of the SIEM system 110 may receive event data, such as attributes associated with network traffic and/or system activity data generated by nodes or software executing on the nodes, as illustrated by arrow 130. In this regard, the rules engine 112 may receive event data, including the network traffic and/or system activity data for any number of nodes on any number of networks or sub-networks (i.e., a portion of nodes that make up a larger network.) From the network traffic and/or system activity data the rules engine 112, or another component of the SIEM system 110, may identify the attributes associated with the received network traffic and/or system activity data.

For instance, event data may be generated by firewalls, applications, VPNs, authentication systems, web gateways, etc., and other such nodes and software executing on the nodes. In some instances, the event data may include log lines. The SIEM system may parse the received event data into attributes and values associated with these attributes. As used herein, the term "attribute" refers to both the attribute and its respective value(s). For instance, the SIEM system may receive event data and parse out an attribute corresponding to a source address of the node which generated the data. The SIEM system may also determine an attribute value (e.g., 52.53.54.55) that corresponds to the attribute. Attribute values may differ for different events. In some instances, attributes may be pre-defined, but dynamic attributes may also be used.

Figure 2:
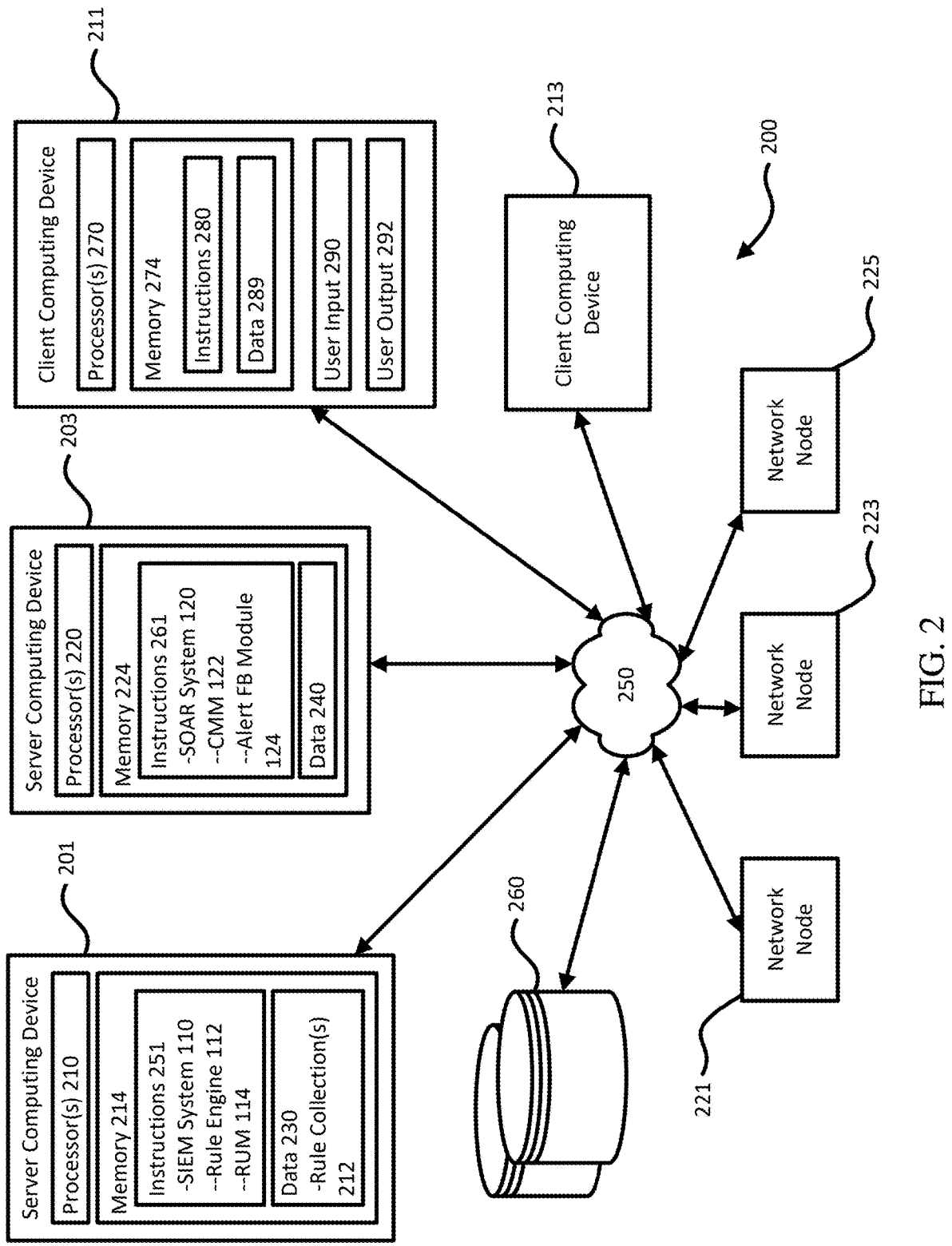
FIG. 2 is a block diagram of a node communicating between a user computing device and a classification system backend.

The rules engine 112 may compare the attributes against a rule collection 212 of one or more rules (shown in FIG. 2.) In this regard, each rule in the collection of rules may have a set of one or more conditions associated with attributes. When the rules engine 112 identifies that the conditions of a rule are satisfied (or not satisfied) by the attributes, the rules engine 112 may generate an alert. These alerts may be transmitted to the SOAR system 120, as illustrated by arrow 132. For each alert, the rules engine 112 or another component within the SIEM system 110 may also transmit an alert identifier and the attributes associated with the received network traffic and/or system activity data that triggered the alert to the CMM 122. In some cases, only the attributes analyzed by the rule that triggered the alert may be provided by the SIEM system 110 to the SOAR system 120.

In some examples, the alert identifiers and attributes associated with the received network traffic and/or system activity data that triggered the alerts may be stored in a repository within the interconnected security management system 100. In such instances, the SIEM system 110 may not transmit attributes associated with the network traffic and/or system activity data that triggered the alerts to the SOAR system 120. Rather, the modules of the SOAR system 120, including the CMM 122 and/or the alert feedback module 124 may be configured to retrieve such information from the repository based on receipt of an identifier, such as the alert identifier, provided within a received alert. In some examples, the repository may store all network traffic and/or system activity data, which may be retrieved by the SOAR System 120.

The CMM 122 of the SOAR system 120 may provide a dashboard or other such interface from which the analyst can review the alerts received from the rules engines 112. For each alert, the analyst may provide feedback to the CMM, as illustrated by arrow 134. The feedback may be an input indicating whether an alert being reviewed by an analyst is a true positive or false positive alert. For instance, and as described further herein, an analyst may access the CMM 122 via a network and review one or more of the alerts, including the alert identifier and attributes associated with the received network traffic and/or system activity data that triggered the alert. For each alert, or a subset of the alerts, the analyst may provide feedback into the CMM 122 indicating whether the alert (or subset of the alerts) is a true positive alert or a false positive alert.

The CMM 122 may pass the feedback received from the analyst to the alert feedback module 124, as illustrated by arrow 136. In some instances, the feedback provided by the analyst may be received by the alert feedback module 124, thereby bypassing the CMM 122. In such cases, the feedback, represented by arrow 134, may be transmitted directly into the alert feedback module 124. In other instances, the feedback provided by the analyst may be transmitted directly to the SIEM system 110, thereby bypassing the alert feedback module 124 and CMM 122.

In some instances, the feedback provided to the alert feedback module 124, whether from the CMM 122 or directly from an analyst, may include the alert identifier and attributes associated with the received network traffic and/or system activity data that triggered the alert. In some examples, only the attributes analyzed by the rule that triggered the alert may be provided by the CMM 122 or analyst to the alert feedback module 124. For instance, an analyst may provide feedback directly to the CMM 122. The CMM 122 may then pass the feedback received by the analyst to the alert feedback module 124 system along with the alert identifier(s) and attributes associated with the received network traffic and/or system activity data that triggered the alert(s) for which the feedback was received. In some instances, the CMM 122 may not pass attributes associated with the network traffic and/or system activity data that triggered the alert to the alert feedback module 124.

The alert feedback module 124 may transmit the feedback, and, in some instances, the alert identifier and attributes associated with the received network traffic and/or system activity data that triggered the alert(s) to the SIEM System 110. For instance, and as illustrated by arrow 138, the feedback may be sent from the alert feedback module 124 to the RUM 114. The RUM 114 may review the feedback to identify rules that generate true positive alerts and/or false positive alerts. For these identified rules, the RUM 114 may determine the attributes assessed by the conditions of the rules. The RUM system may revise the conditions of the identified rules or generate new rules based on the conditions of the identified rules to increase the number of true positive alerts and reduce the number of false positive alerts generated by the collection of rules, as described herein. In this regard, the revised rules may replace the previous versions of those rules in the collection of rules and new rules may be added to the previous versions of the collection of rules.

The updated collection of rules, including the revised rules and new rules, may then be passed to the rules engine 112, as illustrated by arrow 139. The updated collection of rules, with any revised rules and new rules, may then be used by the rules engine 112 as the collection of rules against which the Rules Engine 112 compares network traffic and/or system activities. Although FIG. 1 illustrates the updated collection of rules being passed from the RUM 114 to the rules engine 112, the collection of rules may be stored in a repository in the SIEM system 110 or accessible by the SIEM system 110 and rules engine 112. In this regard, the RUM 114 may update the collection of rules in the repository with the new rules or revised rules.

Although FIG. 1 illustrates the rules engine 112 and RUM 114 as being separate components of the SIEM system 110, each component may be part of another component. For example, the RUM 114 may be a part of the rules engine 112. In other examples, the components of the SIEM system 110 may be spread across multiple devices. For instance, the RUM 114 may be implanted on one computing device, such as a server, and the rules engine 112 may be implemented on another computing device. Similarly, each component of the SOAR system 120, including the CMM 122 and alert feedback module 124 may be part of another component. For example, the alert feedback module 124 may be a part of the CMM 122. In other examples, the components of the SOAR system 120 may be spread across multiple devices. For instance, the CMM 122 may be implanted on one computing device, such as a server, and the alert feedback module 124 may be implemented on another computing device. In some instances, the SIEM system 110 and SOAR system 120 may be implemented on the same or different computing devices.

FIG. 2 is a block diagram illustrating the interconnected security management system 100 of FIG. 1 within a network of devices 200. As illustrated in FIG. 2, the SIEM system 110 is implemented on server computing device 201 and the SOAR system 120 is implemented on another server computing device 203. Consistent with the description of the SIEM system 110 of FIG. 1, the SIEM system 110 includes a rules engine 112 and RUM 114. Likewise, the SOAR system 120 includes a CMM 122 and an alert feedback module 124. Although FIG. 2 illustrates the SIEM system 110 and SOAR system 120 being implemented on separate server computing devices, it should be understood that a single server computing device may implement both systems.

As further shown in FIG. 2, the network of devices 200 includes client computing devices 211 and 213, network nodes 221, 223, and 225, and storage device 260. For the sake of clarity, only two server computing devices, two client computing devices, three network nodes, and a single storage device is shown in FIG. 2, although it should be understood that any number of such devices may be included in the network of devices.

As further shown in FIG. 2, server computing device 201 includes one or more processors 210 and memory 214. Likewise, server computing device 204 may include one or more processors 220 and memory 224. The processors 210, 220 can be a well-known processor or other lesser-known types of processors. Alternatively, the processors 210, 220 can be a dedicated controller such as an application-specific integrated circuit (ASIC).

Memory 214 can store information accessible by processor 210, including data 230 that can be retrieved, manipulated or stored by the processor 210, instructions 251 that can be executed by the processor 210, or a combination thereof. Likewise, memory 224 can store information accessible by processor 220, including data 240 that can be retrieved, manipulated or stored by the processor 220, instructions 261 that can be executed by the processor 220, or a combination thereof.

As further illustrated in FIG. 2, the instructions 251 in server computing device 201 may include the SIEM system 110 and the modules of the SIEM system, including rule engine 112 and RUM 114. Similarly, the instructions 260-261 in server computing device 203 may include the SOAR system 120 and the modules of the SOAR system, including CMM 122 and alert feedback module 124. As such, server computing device may execute the SIEM system 110 and server computing device 203 may execute the SOAR system 120.

Data 230 includes rule collection 212. Although data 230 is illustrated as including rule collection 212, rule collection 212 may additionally, or alternatively, be stored in a storage device, such as storage device 260. Although not illustrated, data 230, 240, and/or storage device 260 may store additional data, such as network traffic and/or system activity data that triggered an alert or all network traffic and/or system activity data.

Memory 214 and memory 224, and storage device 260 may be any type of non-transitory computer readable medium capable of storing information accessible by a processor such as a hard-drive, solid state drive, tape drive, optical storage, memory card, ROM, RAM, DVD, CD-ROM, write-capable, and read-only memories.

Although FIG. 2 functionally illustrates the processors 210, 220 and corresponding memories 214, 224 of each server computing device 201, 203 as being included within a single block, the processor and memory may actually include multiple processors and memories that may or may not be stored within the same physical housing. For example, some of the data and instructions can be stored on a removable CD-ROM, persistent hard disk, solid state drive (SSD), and others. Some or all of the instructions and data can be stored in a location physically remote from, yet still accessible by, the processor. Similarly, the processor can actually include a collection of processors, which may or may not operate in parallel.

Each client computing device may have all of the components normally used in connection with a personal computing device. For instance, and as illustrated in FIG. 2, client computing device 211 includes processor 270, which may be a central processing unit (CPU), memory 274 (e.g., RAM and internal hard drives) storing data 289 and instructions 280, a user input 290, and a user output 292. Although client computing device 211 is illustrated with only one user input 290 and user output 292 in FIG. 2, client computing device 211 may include any number of user input and user output devices. Client computing device 213 may be configured similarly to client computing device 211.

Although the client computing devices 211 and 213 may each comprise a full-sized personal computing device, they may alternatively comprise mobile computing devices capable of wirelessly exchanging data with servers over a network such as the Internet. By way of example only, client computing devices 211 may be a mobile phone, and client computing device 213 may be a laptop. 3. In some instances, client computing devices 211 and 213 may be devices such as wireless-enabled PDAs, tablet PCs, netbooks, head-mounted computing systems, vehicle computer systems, wearable devices (e.g., smartwatch) or any other such computing device.

User output device 292 may be any device operable or otherwise capable of displaying or otherwise providing information, such as a monitor having a screen, a touchscreen, a projector, a television, speakers, haptic devices, or other such devices.

User input device 290 may be any device through which a user can interact with or provide data to a computing device. For instance, user input device 290 of client computing device 211 may be one or more of a mouse, keyboard, keypad, touch-screen, microphone, pen, camera, etc.

Although FIG. 2 functionally illustrates the processor, memory, and other elements of computing device 211 as being within the same block, respectively, the processor, memory, and other elements can actually comprise multiple processors, memories, or other elements that may or may not be stored within the same physical housing. For example, the memory 274 of client computing device 211 can be a hard drive or other storage media, such as RAM, located in one or more housings different from that of the other components of client computing device 211, such as processors 270. Accordingly, references to a processor, memory, or other elements of the computing devices will be understood to include references to a collection of processors, memories, or elements that may or may not operate in parallel. Moreover, each computing device may be comprised of multiple computing devices. Yet further, although some functions described below are indicated as taking place on a single computing device having a single processor, various aspects of the subject matter described herein can be implemented by a plurality of computing devices working in cooperation by, for example, communicating information over network 250, as described herein.

The network nodes 221, 223, and 225 may be any type computing device or network device, including but not limited to storage devices, client computers, server computers, mobile devices, routers, network switches, etc.

Each of the computing devices and network nodes can be at different locations of a network or networks. For instance, and as further illustrated in FIG. 2, server computing devices 201, 203, client computing devices 211, 213, network nodes 221, 223, 225, and storage device 260 may be capable of directly and indirectly communicating with other devices connected to network 250. Although only server computing devices 201, 203, client computing devices 211, 213, network nodes 221, 223, 225, and storage device 260 are depicted in FIG. 2, it should be appreciated that fewer or more computing devices, storage devices, and network nodes may be present. In this regard, a typical system can include a large number of connected computing devices, storage devices, and network nodes with each different device and node being at a different locations of the network 250.

The network 250 can be interconnected using various protocols and systems, such that the network can be part of the Internet, World Wide Web, intranets, wide area networks, or local networks. The network can utilize standard communications protocols and systems, such as Ethernet, Wi-Fi, Bluetooth, and HTTP, protocols that are proprietary to one or more companies, and various combinations of the foregoing. Although certain advantages are obtained when information is transmitted or received, as noted above, other aspects of the subject matter described herein are not limited to any particular manner of transmission of information.

As an example, server computing device 201 may be configured to communicate with storage system 260 as well as server computing device 203, client computing devices 211, 213, and network nodes 221, 223, 225 via the network 250. For example, client computing devices 211, and 213 and network nodes 221, 223, 225 may use network 250 to transmit network and system activity data to server computer 201. Server computing device 201 may provide alerts and alert identifiers and attributes associated with the received network traffic and/or system activity data that triggered the alerts to server computing device 203. Client computing device 211 may connect to the CMM 122 of server computing device 203, so that an analyst can review alerts and provide feedback to alert feedback module 124. Server computing device 203 may provide feedback to server computing device 201.

False Positive Reduction

To reduce the number of false positive alerts, a rule update module (RUM), such as RUM 114 in the SIEM system 110 of the interconnected security management system 100, may update existing rules. In this regard, the RUM 114 may monitor attributes associated with network traffic and/or system activities that trigger rules resulting in true positive alerts and false positive alerts. Within these sets of attributes, the RUM 114 may determine a subset of attributes that were present in network traffic and system activities that triggered a rule that resulted in one or more true positive alerts but no false positive alerts. The RUM 114 may then add (or remove) conditions to the rule so that the rule is triggered only when the subset of attributes are present in the network traffic and system activities.

For instance, and as illustrated in FIG. 3, rule 301 may be configured to trigger an alert when network traffic or system activity data include a subset of attributes that have (1) a location and (2) a tag of "PCI." In this regard, rule 301 may be triggered when any location is included in the attributes of the network traffic or system activity.

During operation of the interconnected security management system 100 the rules engine 112 may compare rule 301 against attributes of network traffic and system activity data received from client computing devices, such as client computing devices 211 and 213 and network nodes, such as network nodes 221, 223, 225. Referring again to FIG. 3, rules engine 112 may detect the attributes of the received network and system activity data satisfies rule 301 four times, resulting in the rules engine 112 generating four alerts, including alert 1 311, alert 2 313, alert 3 315, and alert 4 317. Each alert may be forwarded by the SIEM system 110 to the CMM 122 of the SOAR system 120.

An analyst, such as an analyst using a client computing device 211, may provide feedback for each of the four alerts to the CMM 122, including alert feedback for alert 1 321, alert feedback for alert 2 323, alert feedback for alert 3 325, and alert feedback for alert 4, 327. As further shown in FIG. 3, the alert feedback 1-4 321, 323, 325, 327 may indicate alert 1 311 and alert 3 315 were false positive alerts and alert 2 313 and alert 4 317 were true positive alerts. The CMM 122 may pass the alert feedback 321, 323, 325, 327 to the alert feedback module 124, which may in turn pass the alert feedback 321, 323, 325, 327 to the RUM 114.

RUM 114 may determine a subset of attributes common between the true positive alerts. In this regard, RUM 114 may first identify the attributes associated with the network traffic and system activity data that triggered the alerts. As explained herein, the attributes associated with the network and system activity data that triggered the alerts may be provided from the SOAR system 120 (e.g., by the alert feedback module 124) or retrieved from a repository. As shown in FIG. 3, the alert 1 attributes 331 include a location of Australia, a tag of PCI, and a user "1." The alert 2 attributes 333 include a location of Japan, a tag of PCI, and a user "50." The alert 3 attributes 335 include a location of USA, a tag of DB, and a user "24." The alert 4 attributes 337 include a location of Japan, a tag of PCI, and a user "11."

Based on the attributes of the alert 2 333 and alert 4 337, which alerts were identified in the feedback as true positive alerts, the RUM 114 may determine may determine the rule 301 triggers a true positive alert when the subset of attributes includes location data corresponding to network traffic originating from Japan and having a tag "PCI," as illustrated by block 341 showing the subset of attributes common between the attributes associated with alert 2 313 and alert 4 317.

In this case, the RUM 114 may update the conditions of rule 301 such that the rule is triggered only when the location data in the attributes indicate (1) the network traffic originated from Japan and (2) the tag includes "PCI." The revised rule is illustrated as block 351 in FIG. 3.

The RUM may also adjust rules that result in false positive alerts. In this regard, the RUM may identify a subset of attributes present in network traffic and/or system activities that triggered a rule causing one or more false positive alerts to be generated but no true positive alerts. In this case, the RUM may add inverse conditions to the rule to exclude matches to the subset of attributes from the alerts produced by the rule.

Figure 4:
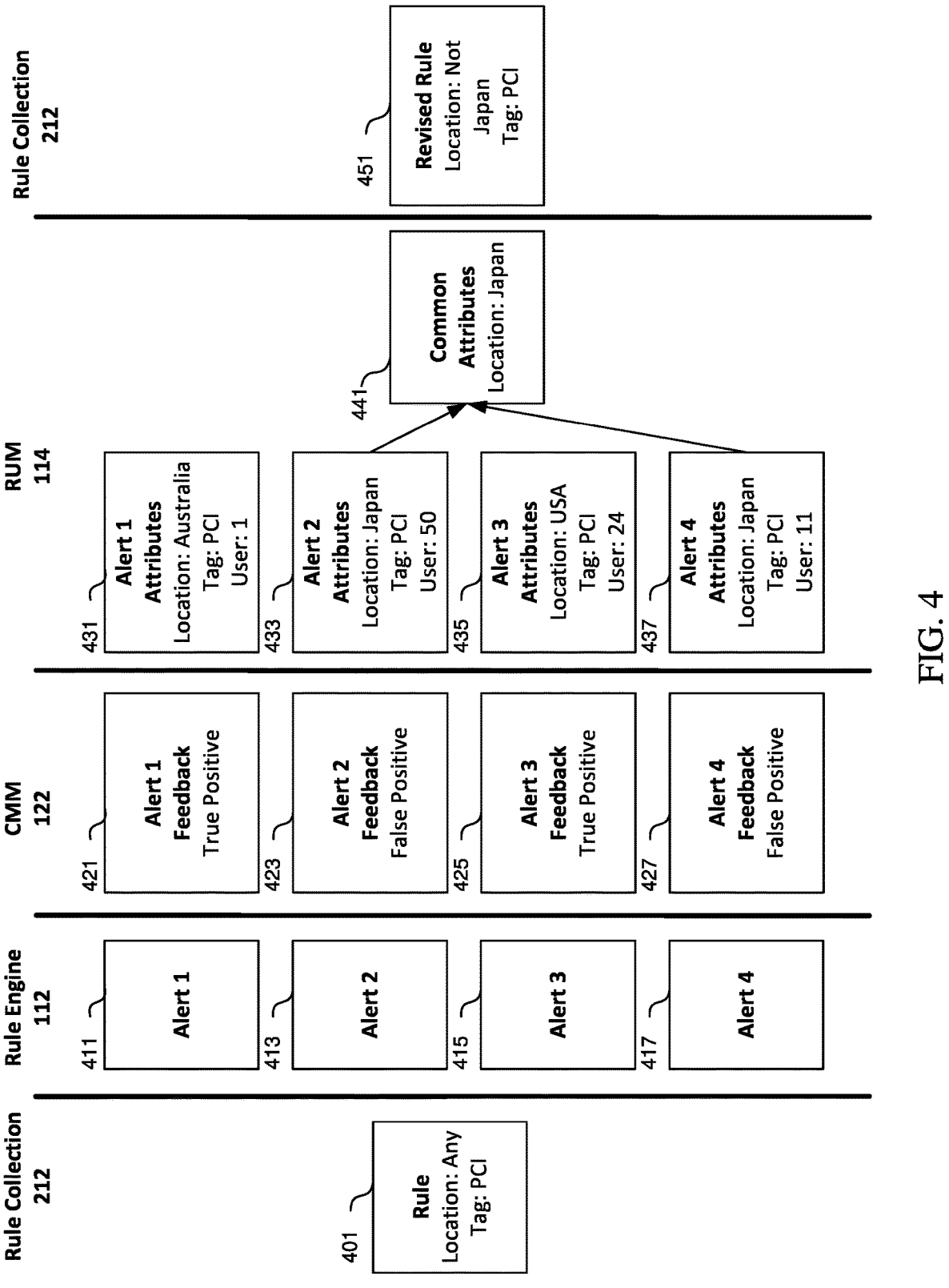
FIG. 4 is a block diagram illustrating another revision of a rule based on alert feedback, according to aspects of the disclosure.

For instance, and as illustrated in FIG. 4, rule 401 may be configured to trigger an alert when network traffic or system activity data includes a subset of attributes that have (1) a location and (2) a tag of "PCI." As further detailed herein, the RUM may determine rule 401 triggers a false positive alert when the subset of attributes includes location data corresponding to network traffic or system activity originating from Japan. In this case, the RUM may update the conditions of the rule such that the rule is triggered only when the location data in the attributes indicate the network traffic did not originate from Japan, as shown in revised rule 451.

During operation of the interconnected security management system 100 the rules engine 112 may compare rule 401 against attributes of network traffic and system activity data received from client computing devices. The rules engine 112 may detect the attributes of the received network and system activity data satisfies rule 401 four times, resulting in the rules engine 112 generating four alerts, including alert 1 411, alert 2 413, alert 3 415, and alert 4 417. Each alert may be forwarded by the SIEM system 110 to the CMM 122 of the SOAR system 120.

An analyst may provide feedback for each of the four alerts to the CMM 122, including alert feedback for alert 1 421, alert feedback for alert 2 423, alert feedback for alert 3

425, and alert feedback for alert 4, 427. As further shown in FIG. 4, the alert feedback 1-4 421, 433, 435, 427 may indicate alert 2 413 and alert 4 417 were false positive alerts and alert 1 411 and alert 3 415 were true positive alerts. The CMM 122 may pass the alert feedback 421, 433, 435, 427 to the alert feedback module 124, which may in turn pass the alert feedback 421, 433, 435, 427 to the RUM 114.

RUM 114 may determine a subset of attributes common between the false positive alerts and not within the true positive alerts. In this regard, RUM 114 may first identify the attributes associated with the network traffic and system activity data that triggered the alerts. As shown in FIG. 4, the alert 1 attributes 431 include a location of Australia, a tag of PCI, and a user "1." The alert 2 attributes 433 include a location of Japan, a tag of PCI, and a user "50." The alert 3 attributes 435 include a location of USA, a tag of PCI, and a user "24." The alert 4 attributes 437 include a location of Japan, a tag of PCI, and a user "11."

Based on the alert attributes 431, 433, 435, 437, the RUM 114 may determine the rule 401 triggers a false positive alert when the subset of attributes includes location data corresponding to network traffic and/or system activity originating from Japan. In this regard, the RUM 114 may identify shared attributes between the alerts that generated the false positive alerts (i.e., alert 2 423 and alert 4 427). Additionally, the RUM 114 may compare the shared attributes to the attributes of other alerts that did not trigger false positive alerts (e.g., alert 1 411 and alert 3 415) to identify shared attributes between the alerts that generated the false positive alerts but not the true positive alerts. In this example, the RUM 114 may determine a false positive alert when the subset of attributes includes location data corresponding to network traffic and/or system activity originating from Japan, as illustrated by block 441.

The RUM 114 may update the conditions of rule 401 such that the rule is triggered only when the location data in the attributes indicate (1) the network traffic originated from any location other than Japan and (2) the tag includes "PCI." The revised rule is illustrated as block 451 in FIG. 4. Although only a single revision is made in the examples shown in FIGS. 3 and 4, any number of revisions may be made depending on the number of attributes and conditions present.

Rules Splitting and Merging

Existing rules may also be split and/or merged to reduce the number of false positive alerts. In this regard, the RUM 114 may collect sets of attributes associated with network traffic and/or system activities that trigger a rule resulting in both true positive alerts and false positive alerts. The RUM 114 may split the rule into two or more experimental rules that contain conditions based on subsets of the sets of attributes associated with the true positive and false positive alerts.

Figure 5:
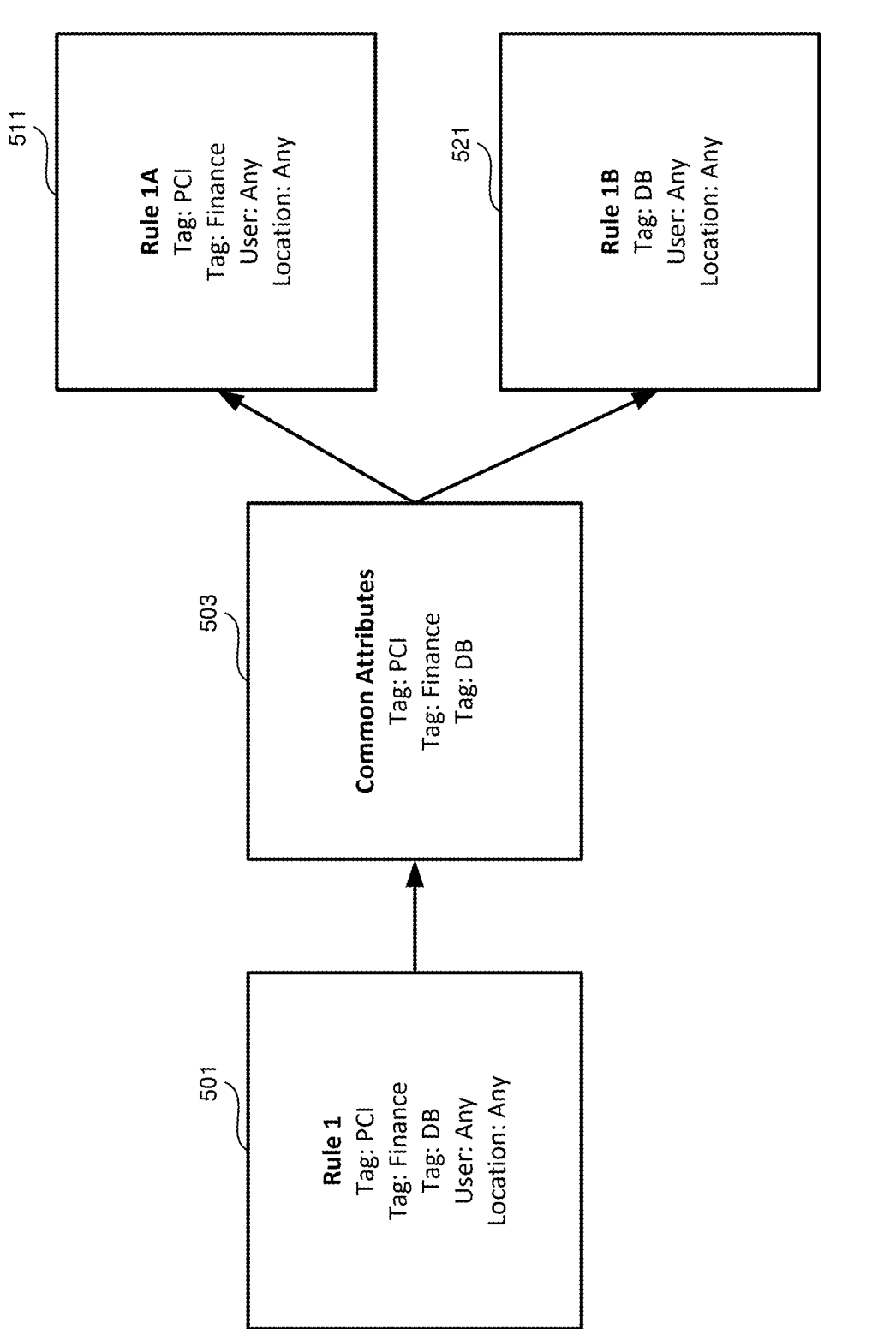
FIG. 5 is a block diagram illustrating the splitting of a rule based on alert feedback, according to aspects of the disclosure.

In case of equal attribution of a subset of attributes to true positive and false positive alert sets—where a subset of identified attributes are equally found in attributes associated with network traffic and/or system activities that trigger true positive and false positive alerts—the RUM 114 may divide the rule into two or more rules with conditions that split the set of attributes in half. For instance, and as illustrated in FIG. 5, rule 1 501 is configured to trigger alerts when a set of attributes are within network traffic and/or system activities data satisfy the given set of conditions. The set of conditions shown in Rule 1 501 include Tag: PCI, Tag: Finance, Tag: DB, User: Any, and Location: Any.

Based on feedback received from a SOAR System 120, a RUM, such as RUM 114 may determine an equal number of true positive and false positive alerts are triggered when a subset of common attributes containing Tag: PCI, Tag: Finance, Tag: DB are within the network traffic and/or system activities data, as illustrated by block 503. To reduce the number of false positives, the RUM 114 may split the rule into two rules that each include a respective portion of the conditions that triggered the alerts. For instance, based on the common attributes 503, Rule 1 501 may be split into experimental Rule 1A 511 and experimental Rule B1 521. As shown, experimental Rule 1A 511 includes common attributes Tag: PCI and Tag: Finance, and experimental Rule 1B 521 includes common attribute Tag: DB. Both experimental Rule 1A 511 and experimental Rule 1B 521 also include non-common attributes User: Any and Location: Any.

In instances where certain attributes appear more in the true positive alerts than false positive alerts, the RUM 114 may split a rule into two experimental rules (or more) to create split experimental rules with conditions that are more likely to lead to true positive alerts. For instance, one of the of experimental rules may contain conditions corresponding to attributes that are more commonly in true positive alerts and the other experimental rule may contain conditions corresponding to attributes that are more commonly in false positive alerts.

For example, an attribute with tag: PCI may appear 70% of the time in true positives alerts and 30% of the time in false positives alerts, whereas tag:DB and tagFinance may occur 35% of the time in true positive alerts and 65% of the time in false positive alerts. In this case, the rule will be split into two experimental rules, with the two experimental rules collectively covering all conditions of the original rule. In this regard, a first of the experimental rules may have a condition on tag: PCI, which occurs in more true positive alerts. The second of the experimental rules may have a condition on tag: DB and tag: Finance, which occur more often in false positive alerts. In some instances, the RUM 114 may split tag: DB and tag: Finance into separate experimental rules, thereby creating three experimental rules. However, in instances where attributes are correlated, they may be considered together and grouped in a single experimental rule. For instance, if a certain attribute always occurs with another attribute (or multiple other attributes) in a true positive or false positive alert, these attributes may be grouped together.

The RUM may monitor the feedback of alerts generated by the experimental split rules received from the SOAR system. In the event the feedback indicates the experimental split rules are generating a greater proportion of true positive to false positive alerts than the original rule, the system may maintain the split rules. However, if the feedback indicates the split experimental rules are generating a similar proportion of true positive alerts to false positive alerts as the original rule, the RUM may merge two or more of the experimental split rules into a single rule. In this regard, the RUM may merge the split rules when they differ only in conditions on certain attributes.

For example, if the experimental rules were split from an existing rule, they may be merged back to form the original rule. For instance, experimental Rule 1 and experimental Rule2 may have been split from original Rule3. The conditions of Rule1 and Rule2 are as follows:

Rule1: event_type=PROCESS_OPEN AND process. pid>2000 and process.pid<4000

Rule2: event_type=PROCESS_OPEN AND process. pid>10000 AND process.pid<12000

In this case, the rule condition structure of Rule1 and Rule2 are the same, but the attribute values in condition are different. That is, Rule1 and Rule2 have the same conditions, but with different values associated with the attributes that satisfy conditions. As the only differences between Rule1 and Rule2 are the attribute values, they may be merged together to form the original rule Rule3, which has the following conditions:

> Rule3: event_type=PROCESS_OPEN AND ((process. pid>2000 and process.pid<4000) OR (process. pid>10000 AND process.pid<12000)).

Creation of New Rules

A rule update module, such as RUM 114 may also create new rules to replace existing rules that produce low numbers of alerts to increase the performance of the rule set in identifying true positive alerts. In this regard, the RUM may identify rules that fail to generate threshold numbers of alerts over a given time period. For an identified rule that fails to generate a threshold number of alerts, the RUM may generate a new rule that excludes one or more conditions within the identified, original rule. The RUM may run this new rule periodically against the same attributes that are run against the original rule. If the new rule produces extra alerts compared to the original rule, the new rule may be included in the set of rules as an experimental rule.

If the new rule does not produce extra alerts, the RUM may delete the new rule and generate another new rule, referred to herein as the "replacement rule." The replacement rule may exclude one or more conditions within the identified original rule, with the one or more excluded conditions being different from those excluded in the previous new rule. This replacement rule may be tested by being run periodically against the same attributes that are run against the original rule. If the replacement rule produces extra alerts compared to the original rule, the replacement rule may be included in the set of rules as an experimental rule. If the replacement rule does not produce extra alerts, the RUM may delete the replacement rule. The RUM may then generate a different replacement rule that (i) excludes one or more conditions within the identified, original rule and that (ii) includes conditions that are at least partially different than those conditions excluded in previous new or replacement rules. This process may continue until all variations of conditions have been identified and tested.

Feedback related to the experimental rules may be provided by the SOAR 120 to the SIEM 110. After the SIEM 110 receives a threshold amount of feedback, the RUM 114 may analyze the feedback to determine whether the majority of alerts generated by the experimental rule are false positive alerts or true positive alerts. If the majority of alerts are classified as false positive alerts, the experimental rule may be removed from the set of rules. If the majority of alerts are classified as true positive alerts, the experimental rule may replace the original rule from which it was generated. If there is insufficient feedback for the alerts generated by the new rule, or the majority of alerts are neither true positive alerts nor false negative alerts, the SIEM 110 may continue to run both the original rule and the new rule.

FIGS. 6-9 are flow diagrams illustrating various methods for performing the operations described herein. The operations do not have to be performed in the precise order described below. Rather, various operations can be handled in a different order or simultaneously, and operations may be added or omitted.

FIG. 6 is a flow diagram illustrating method 600 for creating new rules by a SIEM system, such as SIEM system 110. The SIEM system may receive alert feedback for a set of alerts generated in response to attributes triggering one or more rules. The alert feedback may indicate, for each alert of the set of alerts, whether the alert was a true positive alert or a false positive alert. Based on the alert feedback, a RUM, such as RUM 114, may identify rules that produce no alerts or a number of alerts below a threshold value over a predetermined time period, as shown in block 610. For each identified rule, the RUM may create an experimental rule that excludes one or more conditions from the identified rule, as shown in block 620.

The rules engine may run the experimental rules periodically on the same event data and in the same context as the original identified rules, as shown in block 630. For each experimental rule, the RUM 114 (or another component of the SIEM system) may identify whether the experimental rule produced extra alerts compared to the original identified rule from which the experimental rule was created, as shown in block 640. If the experimental rule did not result in extra alerts being created relative to the original, identified rule, the experimental rule may be deleted and a new experimental rule may be created. In this regard, the one or more conditions excluded from the new experimental rule will be different from the one or more conditions excluded from the previous experimental rule. This process may continue until all variations of one or more conditions are excluded or an experimental rule that triggers extra alerts is created.

For each experimental rule that generates extra alerts, these extra alerts may be sent to the SOAR system as experimental alerts, as indicated in block 650. These experimental alerts may be categorized, such as by an analyst using the SOAR system, as false positive alerts or true positive alerts, as shown by block 660. This alert feedback may be provided to the SIEM system 110. For new rules that generate experimental alerts that are false positives, the RUM 114 may delete the new rule, as shown in block 670. Otherwise, if the experimental alerts are true positives, the RUM 114 may delete the original rule and replace it with the experimental rule, as shown in block 680.

FIG. 7 illustrates an example method 700 for reducing the number of false positive alerts generated by a SIEM system, such as SIEM system 110. In block 710, the system may receive alert feedback for a set of alerts generated in response to attributes triggering one or more rules. The alert feedback may indicate, for each alert of the set of alerts, whether the alert was a true positive alert or a false positive alert.

In block 720, the system may adjust one or more conditions of at least one rule of the one or more rules based on the alert feedback.

FIG. 8 illustrates an example method 800 for reducing the number of false positive alerts by refining one or more rules that trigger true positive alerts. In block 810, the system may receive alert feedback for a set of alerts generated in response to attributes triggering one or more rules. The alert feedback may indicate, for each alert of the set of alerts, whether the alert was a true positive alert or a false positive alert.

In block 820, the system may determine, based on the alert feedback, a subset of the one or more rules that generated true positive alerts. The system may then determine a subset of the attributes that triggered the subset of the one or more rules, as shown in block 830.

The system may then adjust, based on the alert feedback, one or more conditions of at least one rule of the one or more rules, including adding or removing a first condition to or from each rule of the subset of the one or more rules, as shown in block 840.

FIG. 9 illustrates an example method 900 for reducing the number of false positive alerts by refining one or more rules that trigger false positive alerts. In block 910, the system may receive alert feedback for a set of alerts generated in response to attributes triggering one or more rules. The alert feedback may indicate, for each alert of the set of alerts, whether the alert was a true positive alert or a false positive alert.

In block 920, the system may determine, based on the alert feedback, a subset of the one or more rules that generated false positive alerts. The system may then determine a subset of the attributes that triggered the subset of the one or more rules, as shown in block 930.

The system may then adjust, based on the alert feedback, one or more conditions of at least one rule of the one or more rules, including adding inverse conditions to each rule of the subset of the one or more rules, as shown in block 940.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification, the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A computer-implemented method comprising:

receiving, by one or more processors, alert feedback for a set of alerts generated in response to attributes triggering one or more rules, the alert feedback indicating, for each alert of the set of alerts, whether the respective alert was a true positive alert or false positive alert; and determining, by the one or more processors based on the alert feedback, a first rule of the one or more rules that generated a set of true positive alerts and a set of false positive alerts;

determining, by the one or more processors, a first subset of the attributes that triggered the first rule to generate the set of true positive alerts;

determining, by the one or more processors, a second subset of the attributes that triggered the first rule to generate the set of false positive alerts; and adjusting, by the one or more processors, one or more conditions of the first rule by splitting the first rule into two experimental rules, wherein one of the experimental rules contains a first subset of conditions based on the first subset of attributes and the other of the experimental rules contains a second subset of conditions based on the second subset of attributes.

2. The method of claim 1, further comprising:

determining, by the one or more processors based on the alert feedback, a second rule of the one or more rules that generated a set of true positive alerts without any false positive alerts;

determining, by the one or more processors, a third subset of the attributes that triggered the second rule to generate the set of true positive alerts without any false positive alerts; and adjusting, by the one or more processors, one or more conditions of the second rule such that the second rule is triggered only when the third subset of attributes are present in network traffic or system activities.

3. The method of claim 1, further comprising:

determining, by the one or more processors based on the alert feedback, a second rule of the one or more rules that generated a set of false positive alerts without any true positive alerts;

determining, by the one or more processors, a third subset of the attributes that triggered the second rule to generate the set of false positive alerts without any true positive alerts; and adjusting, by the one or more processors, one or more conditions of the second rule by adding inverse conditions based on the third subset of attributes to prevent the second rule from triggering when the third subset of attributes are present in network traffic or system activities.

4. The method of claim 1, further comprising monitoring, by the one or more processors, alert feedback for the two experimental rules.

5. The method of claim 1, wherein the set of alerts are generated by a security information event management (SIEM) system.

6. The method of claim 1, wherein a security orchestration, automation, and response (SOAR) system provides the alert feedback.

7. The method of claim 1, wherein the one or more conditions correspond to one or more attributes assessed by the first rule.

17

8. The method of claim 4, further comprising:

determining, by the one or more processors based on the alert feedback for the two experimental rules, that the two experimental rules are generating a greater proportion of true positive to false positive alerts than the first rule; and maintaining, by the one or more processors, the two experimental rules.

9. The method of claim 4, further comprising:

determining, by the one or more processors based on the alert feedback for the two experimental rules, that the two experimental rules are generating an equal to or less than proportion of true positive to false positive alerts than the first rule; and merging, by the one or more processors, the two experimental rules back into the first rule.

10. A system comprising:

one or more computing devices executing a security information event management (SIEM) system, wherein the one or more computing devices comprise memory and one or more processors, and wherein the SIEM system is configured to:

receive alert feedback for a set of alerts generated in response to attributes triggering one or more rules, the alert feedback indicating, for each alert of the set of alerts, whether the respective alert was a true positive alert or false positive alert;

determine, based on the alert feedback, a first rule of the one or more rules that generated a set of true positive alerts and a set of false positive alerts;

determine a first subset of the attributes that triggered the first rule to generate the set of true positive alerts;

determine a second subset of the attributes that triggered the first rule to generate the set of false positive alerts; and adjust one or more conditions of the first rule by splitting the first rule into two experimental rules, wherein one of the experimental rules contains a first subset of conditions based on the first subset of attributes and the other of the experimental rules contains a second subset of conditions based on the second subset of attributes.

11. The system of claim 10, wherein the SIEM system is further configured to:

determine, based on the alert feedback, a second rule of the one or more rules that generated a set of true positive alerts without any false positive alerts;

determine a third subset of the attributes that triggered the second rule to generate the set of true positive alerts without any false positive alerts; and adjust one or more conditions of the second rule such that the second rule is triggered only when the third subset of attributes are present in network traffic or system activities.

12. The system of claim 10, wherein the SIEM system is further configured to:

determine, based on the alert feedback, a second rule of the one or more rules that generated a set of false positive alerts without any true positive alerts;

determine a third subset of the attributes that triggered the second rule to generate the set of false positive alerts without any true positive alerts; and adjust one or more conditions of the second rule by adding inverse conditions based on the third subset of attributes to prevent the second rule from triggering when the third subset of attributes are present in network traffic or system activities.

13. The system of claim 12, wherein the SIEM system is further configured to monitor alert feedback for the two experimental rules.

14. The system of claim 10, further comprising a security orchestration, automation, and response (SOAR) system.

15. The system of claim 14, wherein the SOAR system is configured to provide the alert feedback.

16. The system of claim 10, wherein the one or more conditions correspond to one or more attributes assessed by the first rule.

17. A non-transitory computer-readable medium storing instructions that, when executed by one or more processors, cause the one or more processors to:

receive alert feedback for a set of alerts generated in response to attributes triggering one or more rules, the alert feedback indicating, for each alert of the set of alerts, whether the alert was a true positive alert or false positive alert;

determine, based on the alert feedback, a first rule of the one or more rules that generated a set of true positive alerts and a set of false positive alerts;

determine a first subset of the attributes that triggered the first rule to generate the set of true positive alerts;

determine a second subset of the attributes that triggered the first rule to generate the set of false positive alerts; and adjust one or more conditions of the first rule by splitting the first rule into two experimental rules, wherein one of the experimental rules contains a first subset of conditions based on the first subset of attributes and the other of the experimental rules contains a second subset of conditions based on the second subset of attributes.

18. The non-transitory computer-readable medium of claim 17, wherein the instructions further cause the one or more processors to:

determine, based on the alert feedback, a second rule of the one or more rules that generated a set of true positive alerts without any false positive alerts;

determine a third subset of the attributes that triggered the second rule to generate the set of true positive alerts without any false positive alerts; and adjust one or more conditions of the second rule such that the second rule is triggered only when the third subset of attributes are present in network traffic or system activities.

19. The non-transitory computer-readable medium of claim 17, wherein the instructions further cause the one or more processors to:

determine, based on the alert feedback, a second rule of the one or more rules that generated a set of false positive alerts without any true positive alerts;

determine a third subset of the attributes that triggered the second rule to generate the set of false positive alerts without any true positive alerts; and adjust one or more conditions of the second rule by adding inverse conditions based on the third subset of attributes to prevent the second rule from triggering when the third subset of attributes are present in network traffic or system activities.

* * * * *